SOLID STATE SIGNAL LEAD EXTENSION CIRCUIT FOR TELEPHONY

Filed July 31, 1967 2 Sheets-Sheet 1

INVENTORS
FREDERICK H. GARDNER
VAUGHN K. MUNN

BY Hoffman Stone
ATTORNEY

SOLID STATE SIGNAL LEAD EXTENSION CIRCUIT FOR TELEPHONY

Filed July 31, 1967

2 Sheets-Sheet 2

INVENTORS
FREDERICK H. GARDNER
VAUGHN K. MUNN

BY Hoffman Stone

ATTORNEY

United States Patent Office 3,508,008
Patented Apr. 21, 1970

3,508,008
SOLID STATE SIGNAL LEAD EXTENSION CIRCUIT FOR TELEPHONY

Frederick H. Gardner and Vaughn K. Munn, Rochester, N.Y., assignors to Stromberg-Carlson Corporation, Rochester, N.Y., a corporation of Delaware Filed July 31, 1967, Ser. No. 657,320
Int. Cl. H04m 1/76
U.S. Cl. 179—16 4 Claims

ABSTRACT OF THE DISCLOSURE

A signal lead extension circuit for use with DX signalling equipment including a pair of transistors connected in a mutually exclusive switching arrangement to replace the conventional mercury wetted relay. The transistors allow the conventional polar relay to operate responsively to incoming signal pulses received from a distant station, but not in response to out-going signal pulses. They also generate signals for application to the out-going line responsively to signals received from the DX equipment.

BRIEF SUMMARY OF THE INVENTION

Figure 1:
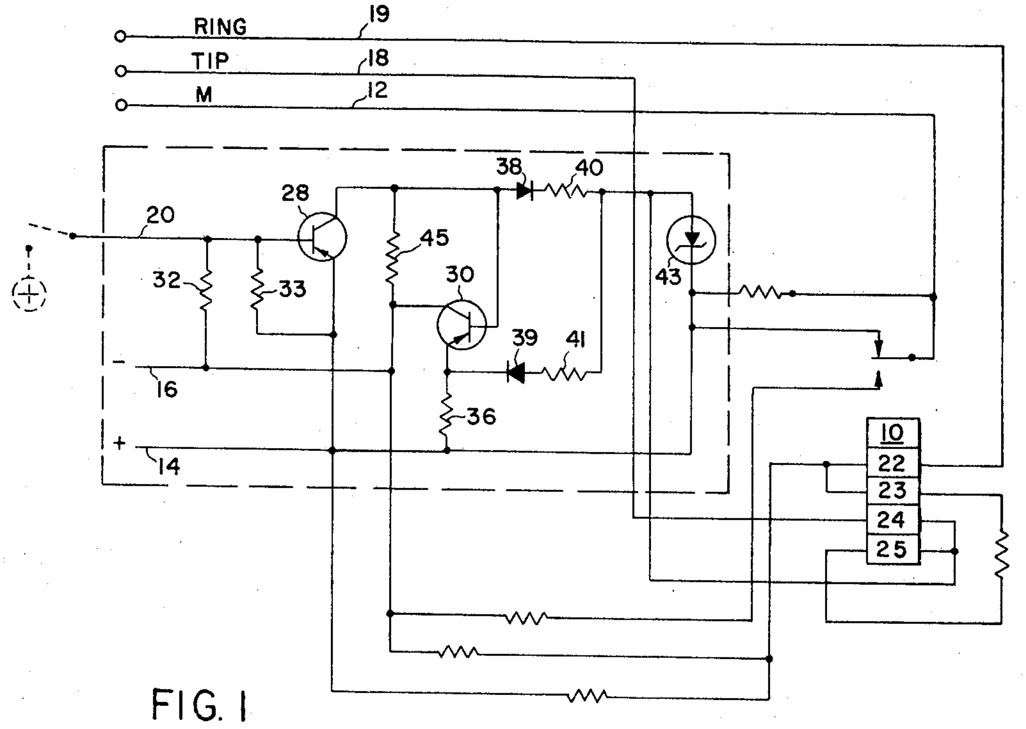

This invention relates to a novel signal lead extension circuit, and, more particularly, to a novel circuit of this type using a pair of switching transistors in place of the conventional mercury wetted relay, which has heretofore been used in circuits of this type because of its characteristic lack of contact bounce.

DX signalling equipment is widely used in automatic telephone signalling systems for producing pulse signals in response to received signals that are often too attenuated to actuate the basic central office switching equipment. They are used especially where the line loop resistance is relatively high, say about 1500 ohms or greater. Circuits of this type normally operate to switch a lead called the E lead from an open circuit condition to the usually grounded positive battery terminal responsively to an incoming negative voltage signal. When it is desired to relay the incoming signal to yet another DX equipment, the signal produced locally at the E lead must be converted from the ground (or positive battery) pulse to a negative pulse. This is the function of a signal lead extension circuit, which usually includes a highly sensitive polar, multi-winding relay for sensing the incoming signals and producing new signals responsively to them which are applied to the so-called M lead of the DX equipment for transmission to the next onward station.

Circuits of this type include arrangements for disabling the polar relay during the occurrence of out-going signals, which appear on the E lead of the local equipment. It is important that the polar relay not operate in response to out-going pulses, otherwise the switching equipment would react as though the signals were incoming ones. The circuit must determine the direction in which the signal is transmitted in any particular case. Heretofore, relatively expensive, mercury wetted relays were connected to perform the functions of disabling the polar relays responsively to pulses appearing on the E leads and for generating out-going pulses.

Signal lead extension circuits are also used in conjunction with other equipments such as, for example, radios, multiplexers, and carrier circuits, to convert pulse signals and to establish the direction of transmission.

Briefly, the circuit of the invention comprises a pair of transistors connected as mutually exclusive, oppositely polarized switches under control of the E lead and connected in the operating circuit of the polar relay. During times when the E lead is open circuited, the transistors provide a current path so that the polar relay operates and pulls up whenever a signal appears on the tip lead of the line, thus enabling the polar relay to operate responsively to signal pulses that are applied to the tip lead at the far end of the line.

Out-pulsing signals from the local equipment are produced simply by grounding the E lead. The transistors are arranged to apply battery voltage through the polar relay to the tip lead of the line responsively to the grounding pulses applied to the E lead. The arrangement is such that so long as the called party remains on-hook, current passes through the polar relay at the local station in a direction to cause it to remain dropped out. The polar relay thus does not operate responsively to pulses originating at its station.

The arrangement further provides for cutting off current flow through the winding of the polar relay controlled by the transistor circuit of the invention when the called party goes off-hook, at which time, and thereafter for the duration of the call, other windings on the polar relay hold it picked up.

DETAILED DESCRIPTION

Figure 2:
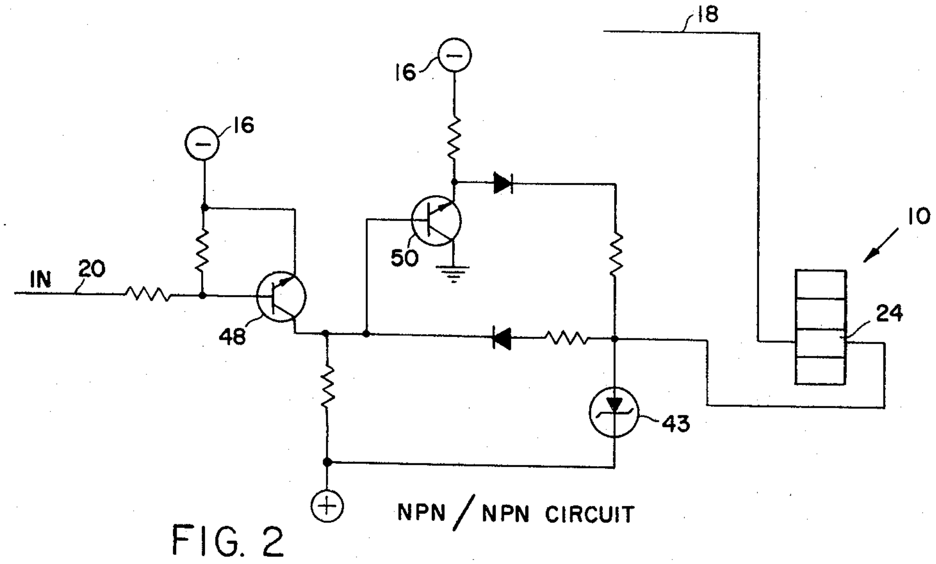
Figure 3:
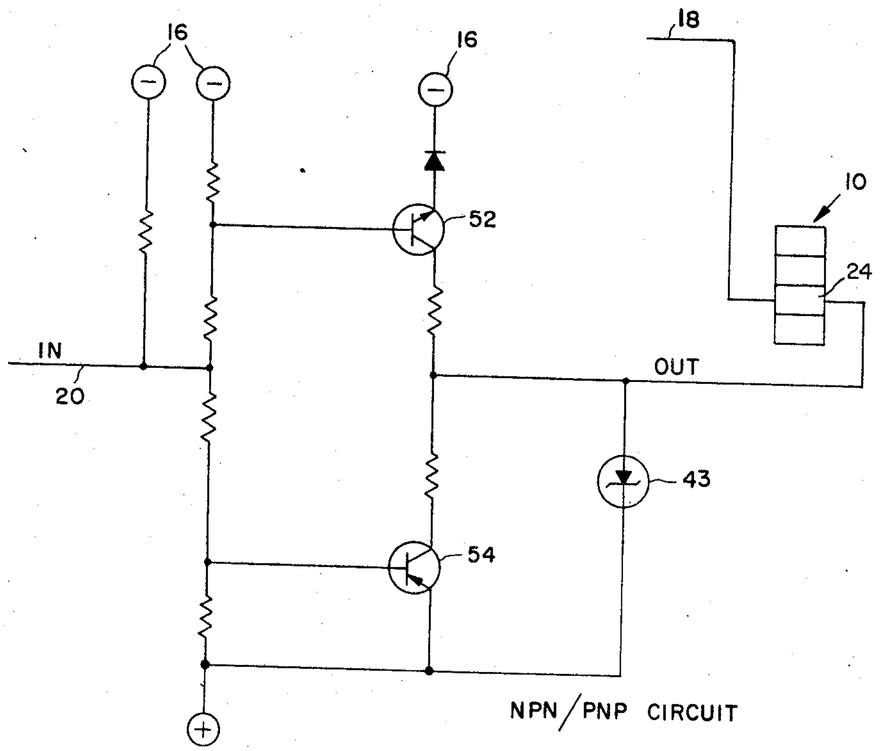

Representative embodiments of the invention will now be described in connection with the accompanying drawing, wherein:

FIGURE 1 is a schematic circuit diagram of a signal lead extension circuit in accordance with a first embodiment of the invention;

FIGURE 2 is a schematic circuit diagram of a modified form of the invention, showing a modified transistor arrangement which may be substituted for the portion of the circuit shown in FIGURE 1 enclosed in dashed lines; and FIGURE 3 is a schematic circuit diagram of a second alternative embodiment of the invention, which may also be substituted for that portion of the circuit shown in FIGURE 1 included within the dashed lines therein.

FIGURE 1 shows a signal lead extension circuit including a highly sensitive polar relay 10 of the conventional type connected to switch a lead 12 denoted the M lead between the positive battery terminal 14 of the exchange, which is normally grounded, and the negative battery terminal 16 responsively to weak incoming negative signals on the tip lead 18 of a two-conductor line, the other lead 19 of which is ordinarily designated the ring lead. The polar relay 10 must not, however, pick up when the tip lead 18 is driven negative by a locally generated signal. The local DX equipment signals the signal lead extension circuit by switching a lead 20 designated the E lead from a normal open-circuit condition to the positive battery terminal 16, or ground.

The polar relay 10 and its operation is well known in the art, and will not be described herein, except to the extent necessary for an understanding of the circuit of the invention. The relay 10 includes four windings 22, 23, 24, and 25, respectively. The first winding 22 is used primarily for balancing purposes, and is connected between the ring lead 19 of the line and the local battery. If the desired balance is present between the local exchange and the remote one to which it is connected for signalling purposes, typically no current flows in the first winding 22. The other three windings 23, 24, and 25 ordinarily control the operation of the relay in accordance with the algebraic sum of the currents in them. The critical winding in connection with an understanding of the present invention is the third winding 24. When the equipment is held seized by a subscriber's being off-hook, current through the winding 24 in one direction, from right to left as viewed in the drawing, will cause the relay 10 to pick up, while current in the opposite direction will not.

The two transistors 28 and 30 in that portion of the circuit with which the present invention is primarily concerned produce directivity in the circuit by controlling the current in the third coil 24. The base of the first transistor 28 is connected directly to the E lead 20 and also to the mid-point of a voltage divider consisting of two resistors 32 and 33, which are connected in series across the local battery. The emitter of the first transistor 28 is connected directly to the positive battery terminal 14, which, as hereinabove explained, is normally grounded. When the E lead 20 is open circuited, the first transistor 28 is biased to a fully ON condition by the voltage divider, and presents a low resistance path from its collector to ground. Any negative voltage applied to the collector of the first transistor 28 under these conditions will cause current to flow.

The collector of the first transistor 28 is connected directly to the base of the second transistor 30, the collector of which is connected directly to the negative battery terminal 16. The emitter of the second transistor is connected through a biasing resistor 36 to the grounded positive battery terminal 14. The collector of the first transistor 28 and the emitter of the second transistor 30 are both connected through respective diodes 38 and 39 and current limiting resistors 40 and 41 to the right-hand terminal of the significant winding 24 of the polar relay. A Zener diode 43 is connected between the right-hand terminal of the winding 24 and ground for protection against lightning induced transients and the like.

In operation, so long as no call is in progress and the local office switching equipment remains ready to receive signals from the remote office, the E lead 20 is kept open, and the first transistor 28 is biased to its fully conductive condition, that is, to saturation. The tip lead 18 is at ground potential until a call is initiated and the remote subscriber starts dialling. Dial pulses are negative relative to ground and appear on the tip lead 18. The tip lead 18 is connected directly to the left-hand terminal of the significant winding 24 of the polar relay, and when it is driven negative by application of the negative-going voltage pulse at the remote station, current flows from right to left as viewed in the drawing through the winding 24 because the path is completed through the diode 38 and the first transistor 28. The relay, therefore, picks up. During times when the tip lead 18 is grounded, that is, during the intervals between the signalling pulses, no current flows because the collector of the first transistor 28 is also approximately at ground potential and no significant voltage appears across the winding 24.

When signals are to be transmitted from the local station to the remote station, the local DX equipment alternately grounds and releases the E lead 20. This results in driving the tip lead 18 negative for the periods that the E lead 20 is grounded, but does not cause the polar relay 10 to pick up. The action is as follows. When the E lead 20 is grounded, the first transistor 28 is cut off and its collector is driven negative through the biasing resistor 45 to the potential of the negative battery terminal 16, thus turning ON the second transistor 30 and placing the negative battery voltage on its emitter. The negative battery voltage is then applied through the diode 39 and the limiting resistor 41 to the right-hand terminal of the significant winding 24, and through the winding 24 to the tip lead 18. The current in this case is from left to right through the winding 24, as viewed in FIGURE 1, and the polar relay 10 does not pick up.

When, now, the called subscriber at the far station goes off-hook, equipment at the far station applies negative battery voltage to the tip lead 18, which opposes the negative battery voltage applied through the second transistor 30 at the local station, thus cutting off current flow through the winding 24. At this time, currents in the other two operating windings 23 and 25 become effective to cause the relay 10 to pick up and to remain picked up for the duration of the call, thereby keeping the desired negative potential on the M lead 12 to maintain seizure of the switching equipment.

The transistors 28 and 30 in the circuit shown in FIGURE 1 are of the PNP type. In one alternative form of the invention, as shown in FIGURE 2, the PNP transistors 28 and 30 may be replaced by NPN transistors 48 and 50, which operate as hereinabove described in connection with the circuit of FIGURE 1, except that the collectors and emitters of the two transistors are interchanged, that is, the negative battery terminal 16 is connected to the emitters of the transistors 48 and 50 instead of to the collectors as in the PNP case.

In a third arrangement as shown in FIGURE 3, based on similar principles to the arrangemnets shown in FIGURES 1 and 2, a PNP transistor may be used in conjunction with an NPN transistor. It is believed, however, that because of its relative simplicity and symmetry, the circuit shown in FIGURE 1 will be found to be the designer's choice for most applications.

Values for the various components of an actual circuit in accordance with the one shown in FIGURE 1, which has been tested and found to operate with a high degree of reliability are as follows:

Transistors 28 and 30—type 2N398A
Limiting resistors 40 and 41—250 ohms
Biasing resistors 36 and 45—18,000 ohms
First voltage dividing resistor 32—27,000 ohms
Second voltage dividing resistor 33—4,700 ohms
Diodes 38 and 39—type 1N881
Zener diode 43—62 volt breakdown

What is claimed is:

1. A signal lead extension circuit for use in a telephone signalling system of the type equipped for E and M signalling comprising:

(a) a multi-winding polar relay arranged to pick up in response to curernt through one of its windings in one direction and to remain dropped out when current passes through said one winding in the opposite direction, said one winding having two terminals the first one of which is connected to one of a pair of wires leading from the local exchange to a remote exchange, and (b) a control circuit connected to the second terminal of said one winding and to the terminals of the direct current battery at the local switching exchange and to the E lead thereof, said control circuit comprising a pair of transistors connected as mutually exclusive switches arranged to complete a conductive path to allow current to flow through said one winding in said one direction during times when the E lead is open circuited in the exchange, and when the E lead is connected to one battery terminal in the local exchange to apply the potential of the opposite battery terminal at said second terminal of said one winding.

2. A signal lead extension circuit in accordance with claim 1, wherein said transistors are both of the PNP type.

3. A signal lead extension circuit in accordance with claim 1, wherein said transistors are both of the NPN type.

4. A signal lead extension circuit in accordance with claim 1, wherein one of said transistors is of the PNP type and the other one thereof is of the NPN type.

References Cited

UNITED STATES PATENTS

| | | | |
|---|---|---|---|
| 3,111,558 | 11/1963 | Proctor | 179—16 |
| 3,393,274 | 7/1968 | Ingraham | 179—16 |

WILLIAM C. COOPER, Primary Examiner

J. S. BLACK, Assistant Examiner